US010483742B2

United States Patent
Naumann et al.

(10) Patent No.: US 10,483,742 B2
(45) Date of Patent: Nov. 19, 2019

(54) CABLE/LEAD INSERTION UNIT

(71) Applicant: EATON PROTECTION SYSTEMS IP GMBH & CO. KG, Schönefeld (DE)

(72) Inventors: Reiner Naumann, Mannheim (DE); Dieter Sauer, Heddesbach (DE)

(73) Assignee: Eaton Intelligent Power Limited, Dublin (IE)

(*) Notice: Subject to any disclaimer, the term of this patent is extended or adjusted under 35 U.S.C. 154(b) by 0 days.

(21) Appl. No.: 15/572,027

(22) PCT Filed: May 6, 2016

(86) PCT No.: PCT/EP2016/060144
§ 371 (c)(1),
(2) Date: Nov. 6, 2017

(87) PCT Pub. No.: WO2016/177863
PCT Pub. Date: Nov. 10, 2016

(65) Prior Publication Data
US 2018/0145492 A1    May 24, 2018

(30) Foreign Application Priority Data

May 6, 2015    (DE) .......................... 10 2015 208 395

(51) Int. Cl.
    *H02G 3/22*      (2006.01)
    *H02G 3/06*      (2006.01)
    *H02G 3/08*      (2006.01)

(52) U.S. Cl.
CPC ............ *H02G 3/22* (2013.01); *H02G 3/0616* (2013.01); *H02G 3/088* (2013.01)

(58) Field of Classification Search
CPC ......... H02G 3/22; H02G 3/0616; H02G 3/088
USPC .................................................. 439/319–321
See application file for complete search history.

(56) References Cited

U.S. PATENT DOCUMENTS

| | | | | |
|---|---|---|---|---|
| 222,713 A | * | 12/1879 | Lawson .................... | F16L 9/08 285/349 |
| 4,050,721 A | * | 9/1977 | Streit ..................... | F16L 21/025 285/231 |
| 4,250,348 A | * | 2/1981 | Kitagawa ............... | H02G 3/065 174/652 |

(Continued)

FOREIGN PATENT DOCUMENTS

| DE | 8107172 U1 | 7/1981 |
|---|---|---|
| DE | 3731149 A1 | 3/1989 |

(Continued)

*Primary Examiner* — Steven T Sawyer
(74) *Attorney, Agent, or Firm* — Stinson LLP

(57) ABSTRACT

A cable/lead insertion unit for the insertion and passing-through of at least one lead into and through a wall opening of a housing wall. An insertion sleeve is used for insertion into the wall opening and a bearing flange at least in places protrudes therefrom radially outwards. Furthermore, a clamp part, in particular screwable onto the insertion sleeve in the direction of the bearing flange, is used, as well as a fastening portion of the insertion sleeve situated opposite the clamp part. The fastening portion on its outside has a partially circumferential thread turn, by which a clamping element can be brought into engagement for pressing the bearing flange onto a rim of the wall opening.

14 Claims, 3 Drawing Sheets

(56) References Cited

U.S. PATENT DOCUMENTS

| | | | |
|---|---|---|---|
| 6,102,442 A | 8/2000 | Gretz | |
| 6,366,436 B1 * | 4/2002 | Maier | G01F 15/06 |
| | | | 361/93.9 |
| 7,722,091 B1 * | 5/2010 | Brockington | E03F 1/00 |
| | | | 285/361 |
| 2012/0224933 A1 * | 9/2012 | Anderson | F16L 5/06 |
| | | | 411/313 |
| 2014/0000937 A1 * | 1/2014 | Alfier | H01B 17/265 |
| | | | 174/153 R |
| 2015/0069750 A1 | 3/2015 | Jung | |

FOREIGN PATENT DOCUMENTS

| | | |
|---|---|---|
| DE | 202004005457 U1 | 6/2004 |
| DE | 202009009807 U1 | 9/2009 |
| EP | 2858190 A2 | 4/2015 |
| FR | 2583496 A1 | 12/1986 |
| WO | 2013159496 A1 | 10/2013 |

* cited by examiner

CABLE/LEAD INSERTION UNIT

FIELD OF THE DISCLOSURE

The present invention relates to a cable/lead insertion unit for inserting and passing through at least one lead into and through a wall opening of a housing wall.

BACKGROUND

Cable/lead insertion units are in particular used for Ex insertions, for example to guide cables or leads into terminal boxes, junction boxes, lamp housings, command elements, measuring instruments or the like. A corresponding cable/lead insertion unit has at least one insertion sleeve for insertion into the corresponding housing opening of the wall surface, a bearing flange at least in places protruding radially outwards from this insertion sleeve, a clamp part, in particular, screwable onto the insertion sleeve in the direction of the bearing flange, and a fastening portion of the insertion sleeve situated opposite the clamp part. The insertion sleeve is inserted into the corresponding housing opening until the corresponding bearing flange abuts at the rim of the opening. In conjunction with the insertion, for cable/lead insertion units known from praxis, the fastening portion is screwed together with a corresponding thread, which is configured in the wall opening. The cables/leads are clamped within the insertion sleeve with the aid of the corresponding clamp part, for example, via iris-shaped clamping lamellae or the like. At the same time, the clamping of the cables/leads within the insertion sleeve results in a corresponding strain relief.

Disadvantageous for this cable/lead insertion unit known from praxis is that a corresponding fastening of the insertion unit within the wall opening takes place via a thread. Such threads have to be manufactured using high precision and, moreover, require a twisting of at least the insertion sleeve in relation to the housing wall. This is relatively time consuming, in particular for a plurality of cable/lead insertion units, which are potentially used for the corresponding housing. Especially in areas with potentially explosive atmosphere, higher requirements apply to such threads for being able to use corresponding electrical devices in areas with potentially explosive atmospheres.

SUMMARY OF THE DISCLOSURE

The object of the present invention is to improve a cable/lead insertion unit of the type mentioned at the outset so that, in particular also for use in areas with potentially explosive atmospheres, a fast installation of the cable/lead insertion unit is possible by simple means.

This object is achieved by the features of patent claim 1. In particular, the present invention is characterized by the fact that the fastening portion on its outside has a partially circumferential thread turn, by which a clamping element (11) can be brought into engagement for pressing the bearing flange onto the rim of the wall opening. As a rule, this clamping element is fitted from the direction of the inside of the housing onto the corresponding fastening portion and is, by pressing the bearing flange onto the rim of the opening, brought into engagement with the thread turn. A twisting of the corresponding insertion sleeve for being bolted with a thread configured in the wall opening is not necessary. Moreover, by using the one thread turn, the fastening of the clamping element is simplified and is possible with little time requirements. The corresponding insertion sleeve by its fastening portion is simply pushed through the housing opening, and the clamping element is fitted onto the part of the fastening portion protruding from the interior of the housing and is mounted by pressing the bearing flange onto the rim of the opening.

It is conceivable that the partially circumferential thread turn is, for example, configured as a partial thread turn, which extends in the peripheral direction of the insertion sleeve by less than 180°. Moreover, it is possible that the thread is formed from at least two thread turn sections. These thread turn sections also run only partially in the peripheral direction around the insertion sleeve. After mounting the corresponding clamping element, the clamping element can be brought into engagement with one or also both of these thread turn sections.

The thread turn sections may be situated in different ways on the outside of the insertion sleeve. A possible positioning may be provided in that the thread turn sections are, for example, situated at a distance from each other in the longitudinal direction of the insertion sleeve and optionally also in the peripheral direction of the insertion sleeve. In a simple exemplary embodiment, the thread turn sections may also be situated only spaced apart in the peripheral direction. In a further conceivable exemplary embodiment, these thread turn sections may be substantially situated spaced apart in the peripheral direction and be situated helically one after another.

Given the small number of thread turn sections, the clamping element may be fastened in a simple manner, at the same time only a small rotation of the clamping element in relation to the thread turn sections being necessary to achieve a sufficient contact force for pressing the bearing flange onto the rim of the opening.

In a simple exemplary embodiment, the clamping element may be configured as a sleeve-shaped clamping element, which on the inside of its sleeve has at least two counter-thread turn sections which can be brought into engagement with the thread turn sections. These are situated analogously to the thread turn sections on the outside of the insertion sleeve and on the inside of the sleeve of the clamping element.

In order to enable within this context a simple fitting of the clamping device onto the fastening portion of the insertion sleeve, distances between the thread turn sections may be greater than a corresponding length of a counter-thread turn section. In this manner, the counter-thread turn sections can be guided between the gaps of the thread turn sections and, by twisting the clamping element, may subsequently be brought into engagement with the thread turn sections. As a rule, only a small rotation of the clamping element, for example by 30° to 90°, is required.

In order to enable also in regard to areas with potentially explosive atmosphere a sufficient sealing of the cable/lead insertion unit in relation to the housing, the bearing flange may have a sealing groove open in the direction of the rim of the opening. For example, an O-ring or the like is insertable into the sealing groove. The corresponding sealing is also carried out by mounting the clamping element and by pressing the bearing flange onto the housing wall or onto the rim of the opening resulting therefrom. Of course, it is also conceivable that a plurality of such sealing grooves may be configured, for example, in a concentric manner to one another at the bearing flange. Also conceivable is the mounting of a sealing groove directly in the housing wall or in the rim of the opening, or the mounting of sealing grooves at the bearing flange as well as at the rim of the opening.

In order to mount the clamp part in a simple manner on the insertion sleeve, the clamp part may be configured as a nut screwable onto the insertion sleeve.

In a simple exemplary embodiment including additional advantages, the nut may be a cap nut and a in particular deformable lead sealing sleeve may be positionable in this cap nut. Also for the present invention, a corresponding sealing of the cables or the leads may be configured by iris-shaped clamping lamellae disposed at the end of the insertion sleeve assigned to the nut. Alternatively to the clamping lamellae or also additionally to the clamping lamellae, the lead sealing sleeve may however also be disposed. When on-screwing the cap nut, the lead sealing sleeve is, in particular, deformed radially inwards and it clamps the corresponding cables or leads in the cable/lead insertion unit. Moreover, the clamping simultaneously results in a corresponding strain relief.

In a simple manner, such a clamping may be carried out with the aid of the lead sealing sleeve in that, when the cap nut is on-screwed, the lead sealing sleeve by its inner end is in contact with the end face of the insertion sleeve and by its corresponding outer end is in contact with the cap nut so that, when the corresponding cap nut is on-screwed, the lead sealing sleeve is deformed by pressing the lead sealing sleeve together.

In order to optionally additionally obtain an anti-rotation locking or loose-resist locking when mounting the clamping piece, a locking plate to be positioned between clamping piece and housing wall can be fitted onto the insertion sleeve. Other securing measures are also conceivable, for example applying a serration on a corresponding underside of the clamping piece, inserting a Schnorr washer or the like. A locking plate is however a very simple option for such a loose-resist and/or anti-rotation locking.

In order to fix the locking plate in specific position, the locking plate may have a safety dog insertable into a locking opening of the housing wall.

In order to be able to additionally secure the insertion sleeve during on-fitting and subsequent twisting of the clamping element, the insertion sleeve may have a bolt flange protruding radially outwards. This bolt flange may be fixed in its position, for example, by a corresponding tool, while the clamping element is mounted and fastened from the direction of the inside of the housing.

In a simple exemplary embodiment, the bolt flange may moreover be configured as a single piece with the bearing flange, the bearing flange being assignable directly to the rim of the opening, while the bolt flange is situated in the longitudinal direction of the insertion sleeve between bearing flange and clamp part. It is also conceivable, that the bearing flange even is configured directly as a bolt flange.

When mounting the clamping element, the clamping element can, from the direction of the inside of the housing, also come in contact with the rim of the opening, for the purpose of which the clamping element has at least a partially circumferential bearing edge for abutting at the housing wall and, in particular, at the rim of the opening. That is, after mounting the clamping element, pressure is exerted on both sides onto the rim of the opening, the bearing flange pressing from one side and the bearing edge pressing from the other side.

In order to optionally enable from the direction of the inside an additional possibility for engaging into a gap between insertion sleeve and housing wall opening, the bearing edge may have at least one engagement section for engaging into the wall opening between the insertion sleeve and the rim of the opening.

As already explained, the cable/lead insertion unit according to the present invention is in particular used in areas with potentially explosive atmosphere and may be in particular configured as an Ex d or Ex e cable/lead insertion unit.

The ignition protection type "d" corresponds to a pressure-resistant casing. This means that a potentially explosive atmosphere may enter into the housing of an electrical device; however, when an explosion occurs within the housing, a transfer of the explosion to the potentially explosive atmosphere surrounding the housing is prevented.

For ignition protection type "e", "increased safety" is provided for the protection of the device. This means that, for corresponding electrical connections through cables or leads, the connections during a clamping process or after insertion into a corresponding housing are not able to disengage from the designated position, that a self-loosening is securely prevented and, moreover, that a sufficient contact pressure is secured without damaging the cables or leads. This contact pressure is not to considerably worsen even for temperature changes occurring during operation.

In certain cases, it may become necessary to replace the cable/lead insertion unit because it or a part of it is damaged. In order to prevent in this instance that, for example, the corresponding leads are to be separated from the electric or electronic device to position a new cable/lead insertion unit, the corresponding parts and, in particular, the insertion sleeve, the clamp part, the clamping element and the lead sealing sleeve are composed of at least two individual elements substantially divided in the axial direction of the cable/lead insertion unit. Along the corresponding separating edges of these individual elements, guide and/or positioning means are disposed for their position-accurate assembling. In so doing, it is possible to replace one cable/lead insertion unit by a new unit without disengaging corresponding cables or leads, in that the corresponding individual elements are fitted onto cables or leads and are connected to one another.

In this instance, the corresponding components are configured in such a manner that the cable/lead insertion unit is usable for areas with potentially explosive atmosphere. In a simple exemplary embodiment for this purpose, the corresponding guide and/or positioning means are configured as guide and/or positioning means snap-fitting into one another. These guide and/or positioning means can only be detached from one another by using a special tool.

Examples for such guide and/or positioning means are latch hooks and/or latch pins and/or latching tongues or the like having corresponding counter-elements in the form of latching and/or plug-in openings. These counter-elements, for example, project from the separating edges of the corresponding components and engage with one another when joining the individual elements. Simultaneously, the individual elements are positioned correctly to one another. In so doing, a cable/lead insertion unit for use in areas with potentially explosive atmosphere, which realizes a corresponding protection type or also explosion protection requirements, for example Ex i or Ex e types, results as an additional possibility. The individual elements are only separable from one another using a corresponding tool and are positionable in the corresponding wall opening of a housing wall without detaching corresponding cables or leads. Conventionally, the fastening is carried out by on-screwing the clamp part as well as also the clamping element.

Subsequently, advantageous exemplary embodiments of the present invention are explained in greater detail on the basis of the figures appended in the drawing.

DETAILED DESCRIPTION

Figure 1:
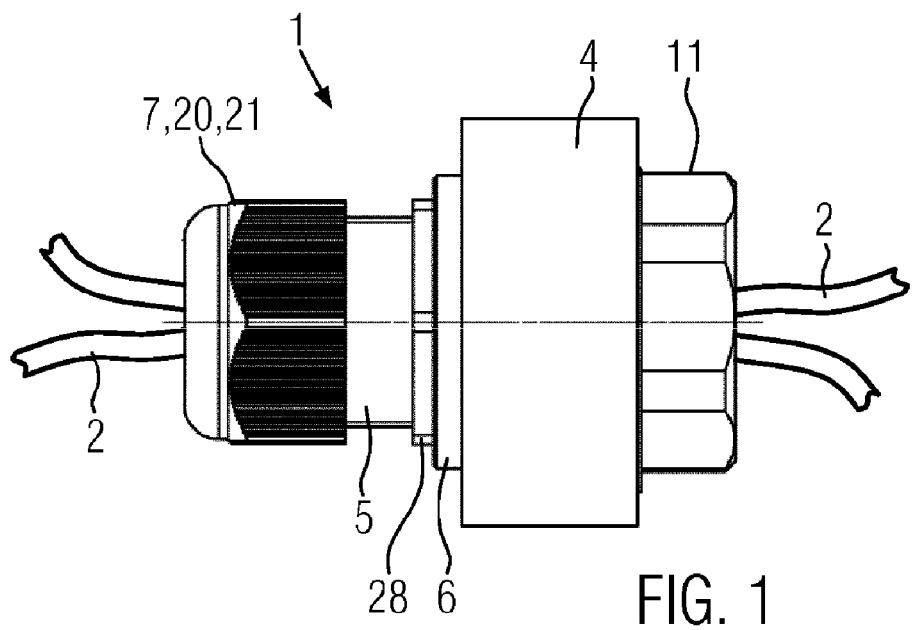
FIG. 1 shows a side view of a first exemplary embodiment of a cable/lead insertion unit according to the present invention.

FIG. 1 shows a first exemplary embodiment of a cable/lead insertion unit 1 according to the present invention in a side view. Only one part of a corresponding housing wall 4, which includes a corresponding wall opening 3, is illustrated (see also FIG. 3). An insertion sleeve 5, as a part of cable/lead insertion unit 1, is fitted through this wall opening 3. A clamp part 7, which in the exemplary embodiment is configured as nut 20 and, in particular, as cap nut 21, is fitted onto one end of the insertion sleeve. This clamp part 7 is screwed onto the corresponding end of insertion sleeve 5. A bearing flange 6 abutting at a corresponding rim 31 of the opening projects radially outwards from insertion sleeve 5 (see also FIG. 5). A bolt flange 28 also projecting radially outwards is disposed adjacently to and as a sing-piece with bearing flange 6. Furthermore, the insertion sleeve has a fastening portion 8 (see, for example, FIG. 3), which in the housing interior protrudes from wall opening 3, and a clamping element 11 is mounted at the fastening portion. By mounting clamping element 11 onto fastening portion 8, bearing flange 6 is pressed onto rim 31 of the opening.

In principle, FIG. 1 shows two cables or leads 2, which are guided through cable/lead insertion unit 1 from an outside of a housing through wall opening 3 into the interior of the housing.

Figure 2:
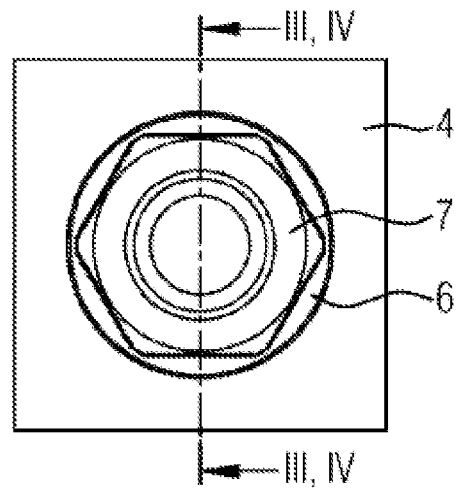
FIG. 2 shows a front view of the cable/lead insertion unit according to FIG. 1.

FIG. 2 shows a front view of the cable/lead insertion unit 1 according to FIG. 1. The hexagonal cross section of clamp part 7, which is screwed onto insertion sleeve 5, can in particular be seen.

Furthermore, in conjunction with the other figures, reference is made to the description of cable/lead insertion unit 1.

Figure 3:
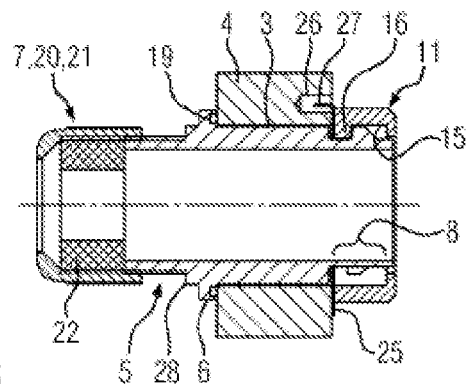
FIG. 3 shows a section along line III-III from FIG. 2.

FIG. 3 shows a longitudinal section through cable/lead insertion unit 1 according to FIG. 1 along line III-III from FIG. 2.

A lead sealing sleeve 22, which is radially inwardly deformable if clamp part 7 is correspondingly screwed onto insertion sleeve 5, is situated between clamp part 7 in the form of a cap nut 21 and insertion sleeve 5. In so doing, corresponding leads 2 (see FIG. 1) are clamped within lead sealing sleeve 22, so that corresponding cable/lead insertion unit 1 according to the present invention, for example, also serves as strain relief.

Bearing flange 6 on its inside facing rim 31 of the opening has an open sealing groove 19, into which, for example, an O-ring is insertable as a sealing means. For purposes of simplification, this O-ring is not shown in FIG. 3.

Bolt flange 28 is configured immediately abutting at and as a single piece with bearing flange 6 (see also FIG. 1).

Cable/lead insertion unit 1 shown in FIG. 3 is configured as an Ex d insertion.

Clamping element 11 is situated on fastening portion 8 of insertion sleeve 5. Fastening portion 8 has a thread turn 10 partially circumferential in peripheral direction 14 (see also FIG. 4), which is for example formed by two thread turn sections 12, 13. These thread turn sections 12, 13 can bring corresponding counter-thread turn sections 16 into engagement on a sleeve inside 15 of clamping element 11 configured in the shape of a sleeve. By twisting clamping element 11 correspondingly into the peripheral direction, bearing flange 6 is pressed onto rim 31 of the opening. Corresponding thread turn sections 12, 13 may be disposed at a distance from one another in the peripheral direction, having a corresponding distance 17 (for example, see FIG. 4). In this instance, these thread turn sections 12, 13 may also extend helically in the direction of bearing flange 6. Both thread turn sections 12, 13 may each be configured helically, but are situated substantially at the same distance from bearing flange 6.

Counter-thread turn sections 16 are configured analogously to thread turn sections 12, 13. A corresponding length 18 of each thread/counter-thread turn section 16 is smaller than distance 17 between adjacent thread turn sections 12, 13, so that counter-thread turn sections 16 are insertable through the gaps between thread turn sections 12, 13 and they subsequently, by correspondingly twisting clamping element 11 together with thread turn sections 12, 13, can be brought into engagement for pressing bearing flange 6 onto rim 31 of the opening.

Clamping element 11 on its side facing housing wall 4 has a bearing edge 29 (see also FIG. 4) which, if counter-thread turn sections 16 correspondingly engage with thread turn sections 12, 13, is pressable against the inner rim 31 of wall opening 3. A securing mechanism in the form of a locking plate 25 is situated between clamping element 11 and housing wall 4 or rim 31 of the opening. This locking plate is also fitted onto insertion sleeve 5 and inserted together with a safety dog 27 into a corresponding locking opening 26 in housing wall 4.

Figure 4:
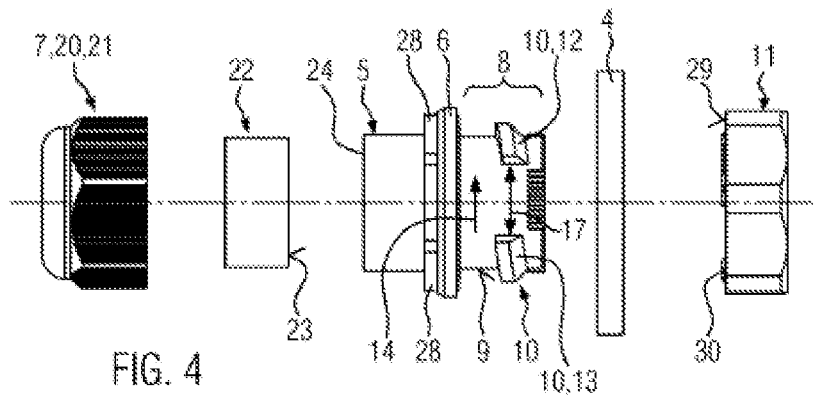
FIG. 4 shows a side view of a second exemplary embodiment of a cable/lead insertion unit according to the present invention in an exploded illustration.

FIG. 4 shows a further exemplary embodiment of a cable/lead insertion unit 1 according to the present invention. This cable/lead insertion unit is substantially constructed analogously to cable/lead insertion unit 1 according to FIG. 3. The difference is manifested substantially in thinner housing wall 4 and the configuration of cable/lead insertion unit 1 in a different ignition protection type, namely the Ex e type. In the exemplary embodiment according to FIG. 4, a corresponding locking plate 25 is not shown, however may also be used if required.

The corresponding section of insertion sleeve 5 between bearing flange 6 and thread turn sections 12, 13 has a smaller length than in FIG. 3. Correspondingly, housing wall 4 is configured having a smaller thickness. Furthermore, the structure of cable/lead insertion unit 1 corresponds to the cable/lead insertion unit according to FIG. 3 and it is referred to the corresponding description in conjunction with this figure or also with FIGS. 1 and 2.

Figure 5:
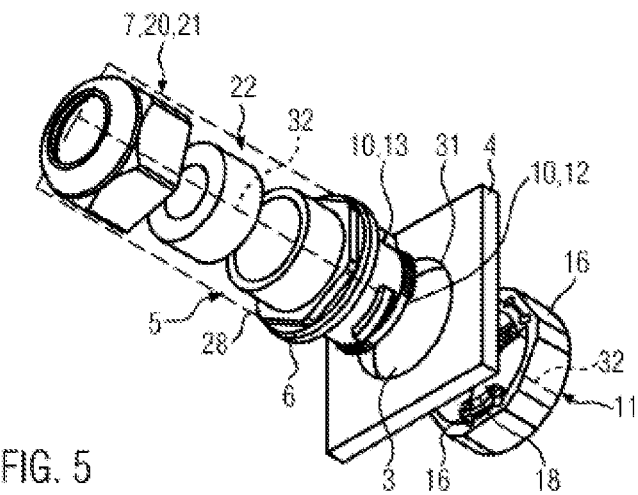
FIG. 5 shows a perspective view of the exemplary embodiment according to FIG. 4.

FIG. 5 shows a perspective view of cable/lead insertion unit 1 according to FIG. 4. In particular (also see FIG. 4) two thread turn sections 12, 13 are visible, which extend in peripheral direction 14 on a corresponding outside 9 of insertion sleeve 5. Instead of two thread turn sections 12, 13, optionally also three or four thread turn sections may be provided, which analogously in peripheral direction 14 are situated one after another and at a distance from one another. Corresponding to the number of thread turn sections, clamping element 11 on its sleeve inside 15 has an at most equal number of counter-thread turn sections 16. These counter-thread turn sections are configured having a corresponding length 18, which is smaller than a corresponding distance 17 between adjacent thread turn sections 12, 13 (see FIG. 4). In this manner, counter-thread turn sections 16 can be guided between adjacent thread turn sections 12, 13 and, by twisting the clamping element, may subsequently be brought into engagement and contact with thread turn sections 12, 13.

For some exemplary embodiments according to the present invention, clamping element 11 has a bearing edge 29 which in places has engagement sections. These engagement sections are insertable into a gap between outside 9 of insertion sleeve 5 and the inside of wall opening 3. In so doing, insertion sleeve 5 may be correspondingly centered within wall opening 3.

FIG. 5 shows furthermore a separating line 32, which extends substantially in the axial direction of the cable/lead insertion unit. This separating line 32 characterizes a further exemplary embodiment of the present invention, in which clamp part 7, lead sealing sleeve 22, insertion sleeve 5 and clamping element 11 are composed of at least two components. These components form, for example, half shells, which correspond to respectively one half of clamp part 7, lead sealing sleeve 22, insertion sleeve 5 and clamping element 11. The corresponding components along their separating edges are connectable to one another in a snap-fit manner along with the aid of corresponding guide and/or positioning means. Corresponding latching connections are formed by latch hooks, latch pins, latching tongues or the like, which can be brought into engagement with corresponding counter-elements in the form of latching or plug-in openings. Instead of corresponding latching tongues, insertion tongues are also useable. The latching elements prevent a detaching of the components from one another, and a detaching of components is only possible when using a corresponding special tool. As a result, even given such a partition of the various elements into components, the cable/lead insertion unit according to the present invention is usable for areas with potentially explosive atmosphere. Furthermore, it is possible to additionally dispose a sealing structure between the individual elements, which forms a seal of the corresponding leads vis-à-vis the outside space.

The components are able to be fitted from the outside and from opposite lying sides onto a lead connected with a corresponding electric or electrical device. The corresponding guide and/or positioning means are connected to one another when the individual elements approach one another and they then enable in a usual manner to screw clamp part 7 onto insertion sleeve 5 or to screw clamping element 11 onto partially circumferential thread turn 10.

Figure 6:
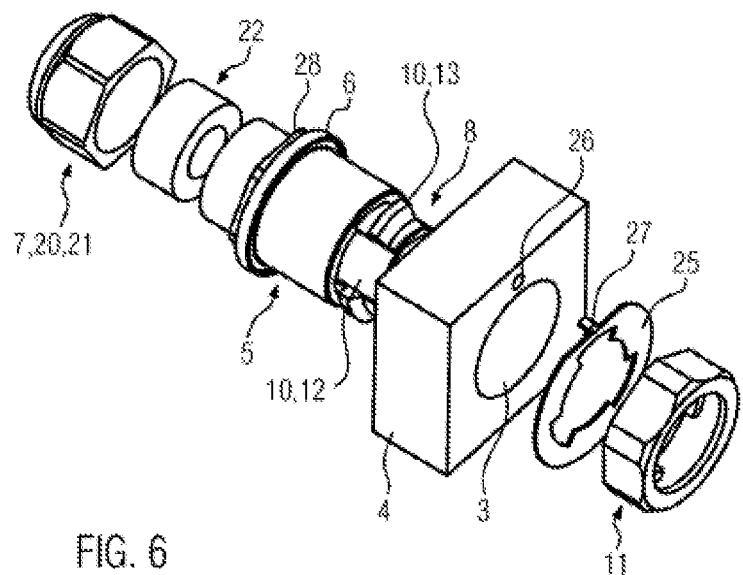
FIG. 6 shows a perspective view of a further exemplary embodiment analogous to FIGS. 4 and 5 for a different ignition protection type.

FIG. 6 shows a further exemplary embodiment of a cable/lead insertion unit 1 according to the present invention. This embodiment differs from the exemplary embodiment according to FIG. 5 by a different ignition protection type, namely the Ex d type. Otherwise, the structure substantially corresponds with the structure of the cable/lead unit according to FIG. 5, the section of insertion sleeve 5, which is situated substantially in wall opening 3 (see also FIG. 3), having a greater length than in FIG. 5. Furthermore in FIG. 6, a locking plate 25 is again provided (see also FIG. 3), which is positionable by its safety dog 27 in a corresponding locking opening 26. Furthermore, the structure of cable/lead insertion unit 1 according to FIG. 6 corresponds to the structure of the cable/lead insertion unit according to FIG. 5. This also applies for the positioning of lead sealing sleeve 22 substantially in the interior of cap nut 21, so that lead sealing sleeve 22 abuts by its inner end 23 (see also FIG. 4) at a corresponding end face 24 of insertion sleeve 5 and is, when cap nut 22 is correspondingly on-screwed, radially inwardly deformable.

The exemplary embodiments of the cable/lead insertion unit according to the present invention are characterized by a simple structure, in particular, in the region of fastening portion 8, so that a corresponding clamping element 11 can be fitted onto the fastening portion in a simple manner and can be quickly fastened in that location. Furthermore, insertion sleeve 5 is simply inserted in a wall opening 3 and is, by on-sliding and twisting clamping element 11, subsequently fixed in wall opening 3 under the provision of a corresponding ignition protection type, see in particular Ex d and Ex e types.

What is claimed is:

1. A cable/lead insertion unit for inserting and passing through at least one lead into and through a wall opening of a housing wall, comprising:
    an insertion sleeve for insertion into the wall opening,
    a bearing flange protruding radially outwards from the insertion sleeve,
    a clamp part configured to be screwed onto the insertion sleeve in the direction of the bearing flange, and
    a locking plate including a safety dog insertable into a locking opening in the housing wall,
    wherein the insertion sleeve includes a fastening portion situated opposite the clamp part,
    wherein the fastening portion comprises a single partially circumferential thread turn, by which a clamping element can be brought into engagement for pressing the bearing flange onto a rim of the wall opening,
    wherein the locking plate is configured to be fitted onto the insertion sleeve between the clamping element and the housing wall.

2. The cable/lead insertion unit as recited in claim 1, wherein the thread turn is formed from at least two thread turn sections.

3. The cable/lead insertion unit as recited in claim 2, wherein the thread turn sections are circumferentially spaced apart by circumference distances to define gaps between adjacent ones of the threaded turn sections.

4. The cable/lead insertion unit as recited in claim 3, further comprising the clamping element, wherein the clamping element is configured as a sleeve-shaped clamping element including at least two counter-thread turn sections which can be brought into engagement with the thread turn sections.

5. The cable/lead insertion unit as recited in claim 4, wherein the circumferential distances between the adjacent thread turn sections are greater than arcuate lengths of the counter-thread turn sections.

6. The cable/lead insertion unit as recited in claim 1, wherein the bearing flange comprises a sealing groove open in the direction of the rim of the opening.

7. The cable/lead insertion unit as recited in claim 1, wherein the clamp part is configured as a nut screwable onto the insertion sleeve.

8. The cable/lead insertion unit as recited in claim 7, wherein the nut is a cap nut, the cable/lead insertion unit further comprising a deformable lead sealing sleeve positionable in the cap nut.

9. The cable/lead insertion unit as recited in claim 8, wherein the lead sealing sleeve is configured to be in contact with an end face of the insertion sleeve when the lead sealing sleeve is positioned in the cap nut and the cap nut is screwed on the insertion sleeve.

10. The cable/lead insertion unit as recited in claim 1, further comprising a bolt flange protruding radially outwards from the insertion sleeve, wherein the bolt flange, the bearing flange and the insertion sleeve are configured as a single piece.

11. The cable/lead insertion unit as recited in claim 1, further comprising the clamping element, wherein the clamping element comprises a bearing edge for abutment at the rim of the wall opening, the bearing edge comprising at least one engagement section for engaging into the wall opening between the insertion sleeve and the rim of the wall opening.

12. The cable/lead insertion unit as recited in claim 1, wherein the cable/lead insertion unit is an Ex cable/lead insertion unit.

13. The cable/lead insertion unit as recited in claim 1, wherein the partially circumferential thread turn is configured to enable the clamping element to be brought into engagement for pressing the bearing flange onto a rim of the wall opening by rotating the clamping element less than about 360 degrees.

14. The cable/lead insertion unit as recited in claim 13, wherein the partially circumferential thread turn is configured to enable the clamping element to be brought into engagement for pressing the bearing flange onto a rim of the wall opening by rotating the clamping element within the inclusive range of about 30 degrees to about 90 degrees.

* * * * *